B. CHESTER.
Belt Gearing.
No. 18,941.
Patented Dec. 22, 1857.
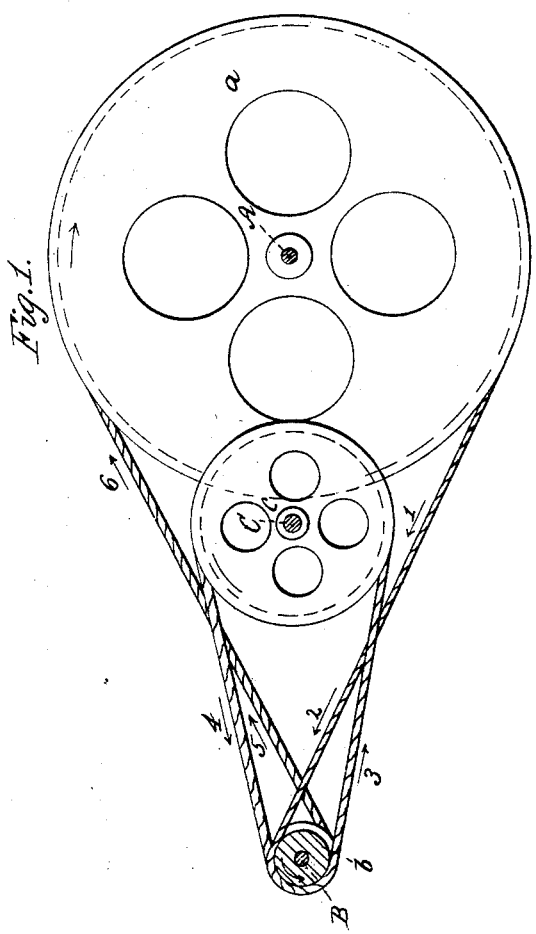
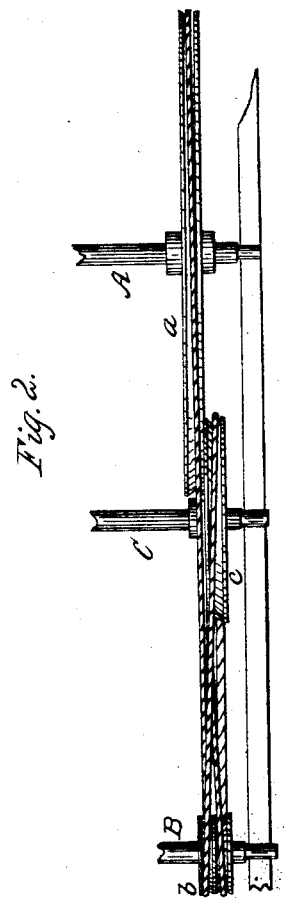

UNITED STATES PATENT OFFICE.

BENJ. CHESTER, OF NEW YORK, N. Y., ASSIGNOR TO W. H. BURNAP, OF LOWELL, MASSACHUSETTS.

MODE OF BELTING.

Specification of Letters Patent No. 18,941, dated December 22, 1857.

*To all whom it may concern:*

Be it known that I, BENJN. CHESTER, of the city, county, and State of New York, have invented a new and useful Improvement in the Arrangement of Belting for Shafting; and I do hereby declare that the following is a full, clear, and exact description of the same, reference being had to the accompanying drawings, making part of this specification, in which—

Figure 1, is a side view, showing the arrangement of a belt according to my invention. Fig. 2, is a top view of the same.

Similar letters of reference indicate the same parts in both figures.

The object of this invention is to prevent the slipping of belts on small pulleys driven by or driving larger ones.

The invention consists in leading a belt from the large pulley around the small one, from thence back to and around an intermediate pulley on a third shaft, from this intermediate pulley back again to and around the small pulley or a pulley of similar size on the same shaft, and from thence back to the large pulley. By this arrangement the smallest pulleys can be driven by or made to drive a belt running over a larger one, without danger of the belt slipping on them, as the belt will hug the small pulley so tight as to be less likely to slip than on the larger one.

To enable others to make and use my invention, I will proceed to describe it with reference to the drawings.

A, is a driving shaft carrying a large driving pulley *a*.

B, is a shaft to be driven at a slow speed, carrying the small pulley *b*.

C, is the shaft of the intermediate pulley *c*, the size of which pulley is not very material, but which may be between the sizes of the large pulley *a*, and small pulley *b*.

*d*, is the endless belt, whose course is marked by arrows which are numbered from 1 to 4.

The pulleys, it will be observed are grooved, the belt being a round one. The large pulley *a*, and the intermediate pulley *c*, have single grooves, as the belt only passes once around them; but the small pulley *b*, has two grooves, as the belt passes twice around it. A flat belt may be used in the same manner as the round one, though for such purposes as the invention is generally intended to be applied, the round belt will be used, and the round belt passes twice around the same shaft more conveniently than a flat one. It may be observed that the belt may run either straight or crossed between the pulleys *a*, and *b*, but that it must run straight between the small pulley *b*, and intermediate pulley *c*.

I do not claim an intermediate pulley between a driving pulley and a pulley to be driven by an endless belt, when such intermediate pulley is merely a guide pulley. Nor do I claim, broadly, the winding of belts several times around the peripheries of windlasses, for the purpose of obtaining additional friction. Examples of ropes and chains thus arranged may be seen in *Dingle's Polytechnic Journal*, Vol. 81, page 4; H. O. Nicholl's device, rejected 1845, and that of Richards & Winsor, 1854. But

What I claim, and desire to secure by Letters Patent, is:

The arrangement and combination of a pulley C, with the pullies A, B, when the driving belt, after passing around the small pulley B, is led therefrom to and around the pulley C, thence around pulley B to and around pulley A, as and for the purposes described.

BENJ. CHESTER.

Witnesses:
J. B. HASKELL,
A. B. BANKS.